United States Patent
Burdgick

(10) Patent No.: US 6,418,618 B1
(45) Date of Patent: Jul. 16, 2002

(54) METHOD OF CONTROLLING THE SIDE WALL THICKNESS OF A TURBINE NOZZLE SEGMENT FOR IMPROVED COOLING

(75) Inventor: Steven Sebastian Burdgick, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/546,772

(22) Filed: Apr. 11, 2000

(51) Int. Cl.$^7$ ................................................ B23P 15/00

(52) U.S. Cl. .................... 29/889; 29/889.21; 29/889.22

(58) Field of Search .......................... 29/889.21, 889.22, 29/889; 416/241 R

(56) References Cited

U.S. PATENT DOCUMENTS

| | | | | |
|---|---|---|---|---|
| 5,224,822 A | * | 7/1993 | Lenahan et al. ............. | 415/189 |
| 5,236,745 A | * | 8/1993 | Gupta et al. ................. | 427/454 |
| 5,318,406 A | * | 6/1994 | Bardes ...................... | 29/889.21 |
| 5,598,968 A | * | 2/1997 | Schaeffer et al. ......... | 29/889.21 |
| 5,723,078 A | * | 3/1998 | Nagaraj et al. .......... | 29/402.07 |
| 5,740,668 A | * | 4/1998 | Fujiwara et al. ......... | 416/241 R |

OTHER PUBLICATIONS

"39$^{th}$ GE Turbine State–of–the–Art Technology Seminar", Tab 1, ""F" Technology—the First Half–Million Operating Hours", H.E. Miller, Aug. 1996.
"39$^{th}$ GE Turbine State–of–the–Art Technology Seminar", Tab 2, "GE Heavy–Duty Gas Turbine Performance Characteristics", F.J. Brooks, Aug. 1996.
"39$^{th}$ Ge Turbine State–of–the–Art Technology Seminar", Tab 3, "9EC 50Hz 170–MW Class Gas Turbine", A. S. Arrao, Aug. 1996.
"39$^{th}$ GE Turbine State–of–the–Art Technology Seminar", Tab 4, "MWS6001FA—An Advanced–Technology 70–MW Class 50/60 Hz Gas Turbine", Ramachandran et al., Aug. 1996.
"39$^{th}$ GE Turbine State–of–the–Art Technology Seminar", Teb 5, "Turbomachinery Technology Advances at Nuovo Pignone", Benvenuti et al., Aug. 1996.
"39$^{th}$ GE Turbine State–of–the–Art Technology Seminar", Tab 6, "GE Aeroderivative Gas Turbines—Design and Operating features", M.W. Horner, Aug. 1996.
"39$^{th}$ GE Turbine State–of–the–Art Technology Seminar", Tab 7, "Advance Gas Turbine Materials and Coatings", P.W. Schilke, Aug. 1996.
"39$^{th}$ GE Turbine State–of–the–Art Technology Seminar", Tab 8, "Dry Low NO$_x$ Combustion Systems for GE Heavy–Duty Turbines", L. B. Davis, Aug. 1996.
"39$^{th}$ GE Turbine State–of–the–Art Technology Seminar", Tab 9, "GE Gas Turb;ine Combustion Flexibility", M. A. Davi, Aug. 1996.
"39$^{th}$ GE Turbine State–of–the–Art Technology Seminar", Tab 10, "Gas Fuel Clean–Up System Design Considerations for GE Heavy–Duty Gas Turbines", C. Wilkes, Aug. 1996.

(List continued on next page.)

Primary Examiner—I Cuda Rosenbaum
(74) Attorney, Agent, or Firm—Nixon & Vanderhye

(57) ABSTRACT

A gas turbine nozzle segment has outer and inner bands and a vane extending therebetween. Each band has a side wall, a cover and an impingement plate between the cover and nozzle wall defining two cavities on opposite sides of the impingement plate. Cooling steam is supplied to one cavity for flow through apertures of the impingement plate to cool the nozzle wall. The side wall of the band has an inturned flange defining with the nozzle wall an undercut region. The outer surface of the side wall is provided with a step prior to welding the cover to the side wall. A thermal barrier coating is applied in the step and, after the cover is welded to the side wall, the side wall is finally machined to a controlled thickness removing all, some or none of the coating.

7 Claims, 2 Drawing Sheets

OTHER PUBLICATIONS

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D.M. Todd, Aug. 1996.

"39th GE Turbine State–of–the–Art Technology Seminar", Tab 14, "Gas Turbine Conversiions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines," J. R. Johnson, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R.R. Heoft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG$^{198}$ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power Density$^{198}$ Steam Turbine Design Evolution", J. H. Moore, Aug. 1996.

"39th GE Turb;ine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbines State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology" J. R. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program—Conceptual Design and Product Development", Annual report, Sep. 1, 1994–Aug. 31, 1995.

"Advanced Turbine Systems (ATS Program) Conceptual Design and Product Development", Final Technical Progress Report, vol. 2–Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearlly Technical Progress Report, Reporting Period: Aug. 25, 1993–Aug. 31, 1994.

"Advanced Turbine Systems" Annual Program Review, Preprints, Nov. 2–4, 1998, Washington, D.C.U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, report Nos. DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combines–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–of–the–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the 21$^{st}$ Century—"H" Gas Turbine Combined Cycles", Thomas C. Paul et al., Report,.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of lthe Advanced Turbine Systems Annual Program Review Meeting", vol. I, "Industrial Advanced Turbine Systems Program Overview", D.W. Esbeck, pp. 3–13, Oct., 1995.

"Proceedings of the Advanced Turbine Systems Annual Program Review Meeting", vol. I, "H Gas Turbine Combined Cycle", J. Corman, pp. 14–21, Oct., 1995.

"Proceedings of the Advanced Turbine Systems Annual Program Review Meeting", vol. I, "Overview of Westinghouse's Advanced Turbine Systems Program", Bannister et al., pp. 22–30, Oct., 1995.

"Proceedings of the Advanced Turbine Systems Annual Program Review Meeting", vol. I, "Allison Engine ATS Program Technical Review", D. Mukavetz, pp. 31–42, Oct., 1995.

"Proceedings of the Advanced Turbine Systems Annual Program Review Meeting", vol. I, "Advanced Turbine Systems Program Industrial System Concept Development", S. Gates, pp. 43–63, Oct., 1995.

"Proceedings of the Advanced Turbine Systems Annual Program Review Meeting", vol. I, "Advanced Turbine System Program Phase 2 Cycle Selection", Latcovich, Jr., pp. 64–69, Oct., 1995.

"Proceedings of the Advanced Turbine Systems Annual Program Review Meeting", vol. I, "General Electric ATS Program Technical Review Phase 2 Activities", Chance et al., pp. 70–74, Oct. , 1995.

"Proceedings of the Advanced Turbine Systems Annual Program Review Meeting", vol. I, "Technical Review of Westinghouse's Advanced Turbine Systems Program", Diakunchak et al., pp. 75–8, Oct., 1995.

"Proceedings of the Advanced Turbine Systems Annual Program Review Meeting", vol. I, "Advanced Combustion Turbines and Cycles: An EPRI Perspective", Touchton et al., pp. 87–88, Oct., 1995.

"Proceedings of the Advanced Turbine Systems Ann;ual Program Review Meeting", vol. I, "Advanced Turbine Systems Annual Program Review", William I. Koop, pp. 89–92, Oct., 1995.

"Porceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy A Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings", pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al., pp. 233–248, Oct., 1995.

"Proceedings of the Advanced Turbine Systems Annual Program Review Meeting", vol. II, "Lean Premixed Flames for Low $No_x$ Combustors", Sojka et al., pp. 249–275, Oct., 1995.

"Proceedings of the Advanced Turbine Systems Annual program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al.,. pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects on Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting, vol. II", "The Role of Reactant Unmixedness, Strain Rate, and Length Scale on Premixed Combustor Performance", Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, "Effects of Geometry on Slot–Jet Film Cooling Performance", Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol .II, "Active Control of Combustion Instabilities in Low $NO_x$ Gas Turbines", Zinn et al., pp. 550–551, Oct., 1995.

"Proceedings of the Advanced Turbine Systems Annual Program Review Meeting", vol. II, "Combustion Instability Modeling Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry–University Consortium", Lawrence P. Golan, pp. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", "Active Control of Combustion Instabilities in Low $NO_x$ Turbines", Ben T. Zinn, pp. 253–264, Nov., 1996.

"Proceedings of the Advanced Turbine Systems Annual Program Review Meeting", "Life Prediction of Advanced Materials for Gas Turbine Application, "Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling compound with Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535,–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov., 7, 1996.

"Testing Program Results Validate GE's H Gas Turbine—High Efficiency, Low Cost of Electricity and Low Emissions", Roger Schonewald and Patrick Marolda, (no date available),.

"Testing Program Results Validate GE's H Gas Turbine—High Efficiency, Low Cost of Electricity and Low Emissions", Slide Presentation—working draft, (no date available).

"The Next Step in H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos. DOE/MC/31176—5628.

"Utility Advanced Turbine System (ATS) Technology Readiness Testing—Phase 3", Document #666274, Oct. 1, 1996–Sep. 30, 1997, Publication Date, Dec. 31, 1997, Report Nos.: DOE/MC/31176—10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos.: DOE/MC/31176—5340.

"Utility Advanced Turbine System (ATS) Technology Readiness Testing and Pre–Commercial Demonstration—Phase 3", Document #486132, Apr.–Jun. 30, 1976, Publication Date, Dec. 31, 1996, Report Nos. DOE/MC/31176—5660.

"Utility Advanced Turbine System (ATS) Technology Readiness Testing and Pre–Commercial Demonstration—Phase 3", Document #587906, Jul. 1–Sep. 30, 1995, Publication Date, Dec. 31, 1995, Report Nos.: DOE/MC/31176—5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Nos.: DOE/MC/31176—8.

"Utility Advanced Turbine System (ATS) Technology Readiness Testing and Pre–Commercialization Demonstration", Jan. 1–Mar. 31, 1996, DOE/MC/31176—5338.

"Utility Advanced Turbine System (ATS) Technology Readiness Testing: Phase 3R", Document #756552, Apr. 1–Jun. 30, 1999, Publication Date, Sep. 1, 1999, Report Nos.: DE—FC21–95MC31176–23.

"Utility Advanced Turbine System (ATS) Technology Readiness Testing. ", Document #656823, Jan.1 –Mar. 31, 1998, Publication Date, Aug. 1, 1998, Report Nos.: DOE/MC/31176–17.

"Utility Advanced Turbine Systems (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998, Publication Date: May, 1, 1999, Report Nos. DE–FC21–95MC31176–20.

"Utility Advanced Turbine Systems (ATS) Technology Readiness Testing", Document #1348, Apr. 1–Jun. 29, 1998, Publication Date Oct. 29, 1998, Report Nos. DE–FC21–95MC31176—18.

"Utility Advanced Turbine Systems (ATS) Technology Readiness Testing—Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Nos. DOE/MC/31176–07.

"Proceedings of the 1997 Advanced Turbine Systems", Annual Program Review Meeting, Oct. 28–29, 1997.

* cited by examiner

METHOD OF CONTROLLING THE SIDE WALL THICKNESS OF A TURBINE NOZZLE SEGMENT FOR IMPROVED COOLING

This invention was made with Government support under Contract No. DE-FC21-95MC311876 awarded by the Department of Energy. The Government has certain rights in this invention.

BACKGROUND OF THE INVENTION

The present invention relates to impingement cooling of a gas turbine nozzle band side wall in a design where the weld joint between the nozzle segment cover and the nozzle side wall is remote from the nozzle wall exposed to the hot gas path and particularly relates to a method of controlling the side wall thickness of the nozzle band to facilitate cooling thereof.

In current gas turbine designs, nozzle segments are typically arranged in an annular array about the rotary axis of the turbine. The array of segments forms outer and inner annular bands and a plurality of vanes extend between the bands. The bands and vanes define in part the hot gas path through the gas turbine. Each nozzle segment comprises an outer band portion and an inner band portion and one or more nozzle vanes extending between the outer and inner band portions. In current gas turbine designs, a cooling medium, for example, steam, is supplied to each of the nozzle segments. To accommodate the steam cooling, each band portion includes a nozzle wall in part defining the hot gas path through the turbine, a cover radially spaced from the nozzle wall defining a chamber therewith and an impingement plate disposed in the chamber. The impingement plate defines with the cover a first cavity on one side thereof for receiving cooling steam from a cooling steam inlet. The impingement plate also defines, along an opposite side thereof and with the nozzle wall, a second cavity. The impingement plate has a plurality of apertures for flowing the cooling steam from the first cavity into the second cavity for impingement cooling the nozzle wall. The cooling steam then flows radially inwardly through cavities in the vane(s), certain of which include inserts with apertures for impingement cooling the side walls of the vane. The cooling steam then enters a chamber in the inner band portion and reverses its flow direction for flow radially outwardly through an impingement plate for impingement cooling the nozzle wall of the inner band. The spent cooling medium flows back through a cavity in the vane to an exhaust port of the nozzle segment.

The cover provided each of the outer and inner band portions is preferably welded to the corresponding nozzle side wall. In prior designs, the weld joint between the cover and the nozzle side wall was disposed at a radial location between the nozzle wall and the spline seal between side walls of adjacent nozzle segments. In that location, the weld was exposed to the high temperature gases in the hot gas flow path and was very difficult to cool. Thus, weld joint fatigue life was significantly reduced due to its proximity to the hot gas path. Moreover, the location of the weld was not optimum for manufacturing repeatability and was very sensitive to manufacturing tolerances. The weld joint was characterized by variable wall thicknesses which increased the stress at the joint, decreased low cycle fatigue and limited the life of the parts. The wall thickness at the weld after machining is also a variable which could not be tolerated in the manufacturing process.

BRIEF SUMMARY OF THE INVENTION

In a current nozzle segment design, the weld joint between the cover and nozzle side wall is on the side of the spline seal remote from the nozzle wall exposed to the hot gas path. That is, the weld joint between the cover and the nozzle side wall of the outer band is located radially outwardly of the spline seal between adjacent outer bands while the weld joint between the cover and the nozzle side wall of the inner band is located radially inwardly of the spline seal between adjacent inner bands. This reduces the temperature of the weld joints during turbine operation, reduces the stresses across the joints, both thermal and mechanical, eliminates any requirement for machining after welding and results in joints of constant thickness and higher fatigue life. The location also leads to improved machinability and tolerance to weld defects.

To provide that weld location, undercut regions adjacent the side walls of the nozzle segment bands are formed. Particularly, each undercut region includes a side wall or edge of the nozzle segment and an inturned flange extending inwardly from and generally parallel to the nozzle wall and spaced from the nozzle wall. Cooling the nozzle band side wall or edge, however, is quite difficult in view of the undercut region which spaces the side wall or edge a substantial distance from the impingement plate which, in turn, reduces the effectiveness of impingement cooling the segment side wall.

In accordance with the present invention, improved side wall fabrication and cooling is provided. Particularly, with the weld joint between the cover and the nozzle side wall located remotely from the hot gas path through the turbine, side wall cooling is facilitated by controlling the thickness of the side wall to a very tight tolerance. As will be appreciated from the foregoing, the side walls of each nozzle segment are very difficult to cool due to the large impingement gap in the undercut region, i.e., the substantial distance between the apertures of the impingement plate nearest the side wall and the side wall per se. The side wall is also not robust to manufacturing processes. This design is very dependent upon the casting process for the nozzle segment and the weld or other distortions that may occur during processing of the segment. If the side wall thickness is too thick, this results in reduced low cycle fatigue due to increased thermal strains on the segment. Increased stresses would also be introduced in this area or other areas of the nozzle segment. Side wall thickness variability is also a problem because post-cast machining operations may leave the wall too thick or too thin or perhaps even remove a portion of the wall. If the wall becomes too thick, reworking the segment is typically not allowed and the segment would have a greatly reduced part life. Also, the wall thickness might be so thick that the part could not be used. A thin wall, similarly as a thick wall, would cause stresses to either increase at the side wall location or in other areas of the segment. As a consequence, it has been determined that side wall thickness must be maintained within very tight tolerances in order to maintain appropriate cooling within the design parameters.

In accordance with a preferred embodiment of the present invention, the side wall thickness of the nozzle segment is controlled by preferably premachining a step in each of the side walls of the nozzle along the outer surface thereof prior to welding the cover to the nozzle segment. The step in the side wall is based on the inside surface position of the side wall, i.e., the datum for the machining is the internal wall surface. A thermal barrier coating (TBC) is applied in a relatively thick layer in the step by masking past the premachined surfaces. Subsequent to welding the covers to the nozzle segments, the side wall is finally machined, i.e., the thermal barrier coating is machined and serves as a buffer for and an accommodation to manufacturing tolerances to afford a predetermined side wall thickness after final machining. Thus, if the cast side wall of the nozzle segment is out-of-tolerance and after machining the TBC is thick, the TBC affords added protection to the side wall as it reduces the thermal gradient through the metal. If the TBC after final machining is relatively very thin or non-existent along the premachined step, due to out-of-tolerance formation of the side wall, this too is acceptable due to the purge of the cavity, i.e., the impingement cooling, and the fact that the wall is of known thickness. Thus, the manufacturing process provides the thermal barrier coating as a means to absorb or accommodate manufacturing tolerances to provide a very controlled wall thickness which will greatly enhance the low cycle fatigue of the segment and reduce any need to scrap the segment by reason of the part being out of tolerances.

In a preferred embodiment according to the present invention, there is provided a method of manufacturing nozzle segments having nozzle bands and vanes extending therebetween, the nozzle bands having side walls adjacent one another when the nozzle segments are assembled for use in a gas turbine, comprising the steps of applying a thermal barrier coating to at least one side wall of each nozzle band and machining one side wall with the thermal barrier coating serving as a buffer to accommodate manufacturing tolerances in the segment thereby controlling the side wall thickness of the nozzle segment.

DETAILED DESCRIPTION OF THE INVENTION

Figure 1:
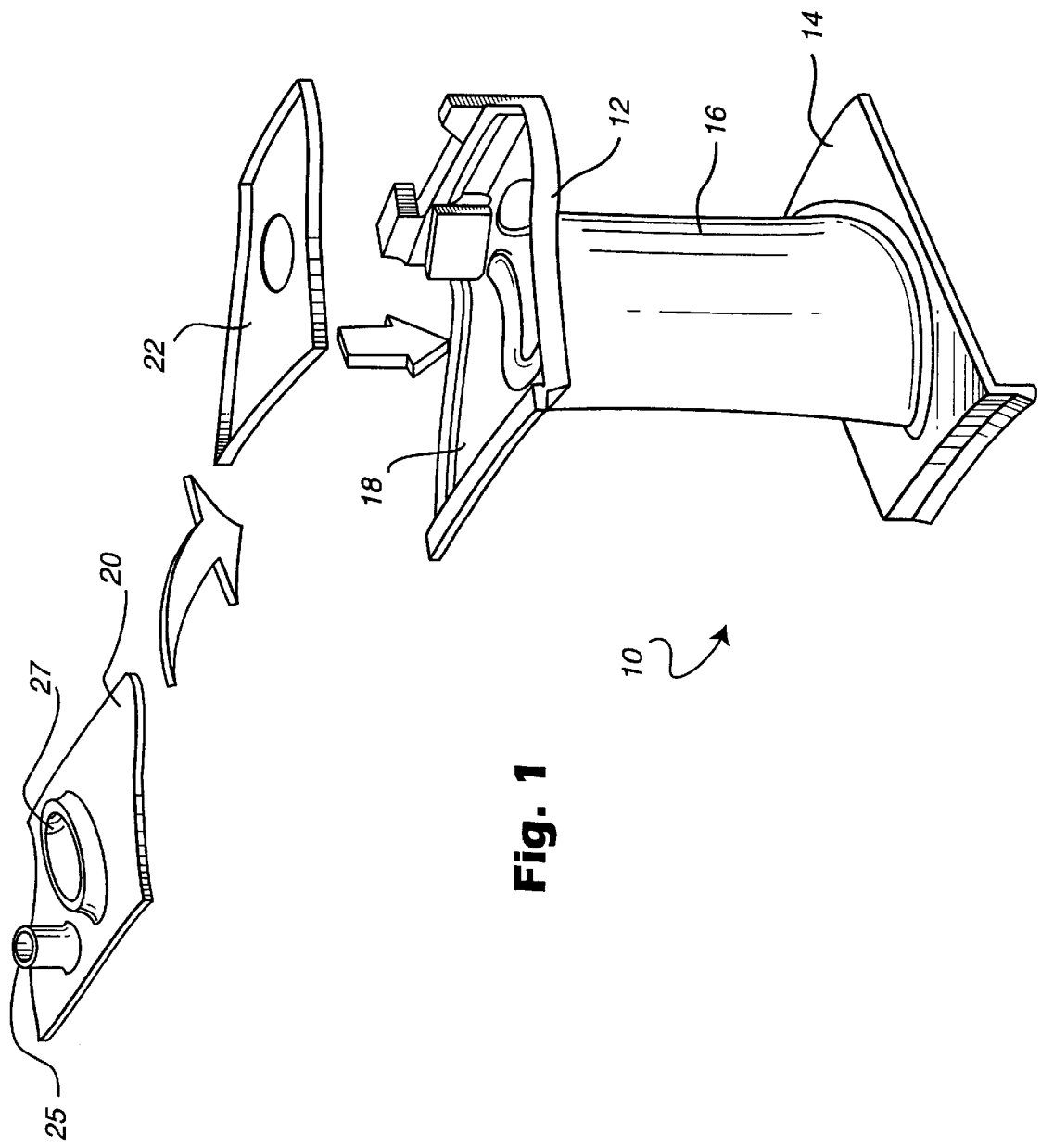
FIG. 1 is an exploded, perspective and schematic view of a nozzle segment constructed in accordance with the present invention.

Referring now to FIG. 1, there is illustrated a nozzle segment, generally designated 10, forming a part of an annular array of segments disposed about a gas turbine axis. Each nozzle segment includes an outer band 12, an inner band 14 and one or more vanes 16 extending therebetween. When the nozzle segments are arranged in the annular array, the outer and inner bands 12 and 14 and vanes 16 define in part an annular hot gas path through the gas turbine, as is conventional.

The outer and inner bands and the vanes are cooled by flowing a cooling medium, e.g., steam, through a chamber of the outer band 12, radially inwardly through cavities in the vanes, through a chamber in the inner band 14 and radially outwardly through the vanes for return of the cooling medium to an exit port along the outer band. More particularly and by way of example with reference to FIG. 1, the outer band 12 includes an outer nozzle wall 18, an outer cover 20 which is disposed over and welded to the outer wall 18 to define a chamber 21 (FIG. 2) therebetween and an impingement plate 22 disposed in the chamber 21. The impingement plate 22 defines with the nozzle segment cover 20 a first cavity 24 and, on an opposite side thereof, defines with the nozzle wall 18 a second cavity 26. Cooling medium inlet and outlet ports 25 and 27, respectively, are provided through the cover for supplying the cooling medium, e.g., steam, to the nozzle vane segment and exhausting the spent cooling steam from the segment. The cooling steam is supplied to the first cavity 24 for passage through a plurality of apertures 30 in the impingement plate 22 for impingement cooling of the nozzle wall 18. The impingement cooling steam flows from the second cavity 26 into one or more inserts (not shown) in cavities extending through the vane between the outer and inner bands. The vane inserts include a plurality of apertures for impingement cooling of the side walls of the vane. The cooling steam then flows into the chamber of the inner band 14 and particularly into the radial innermost cavity for flow through apertures of an impingement plate in the inner band for impingement cooling the side wall of the inner band. The spent cooling steam then flows through a cavity in the vane and through the exhaust port of the outer band. For a complete description of an embodiment of the foregoing described cooling circuit, reference is made to U.S. Pat. No. 5,634,766, of common assignee, the disclosure of which is incorporated herein by reference.

Figure 2:
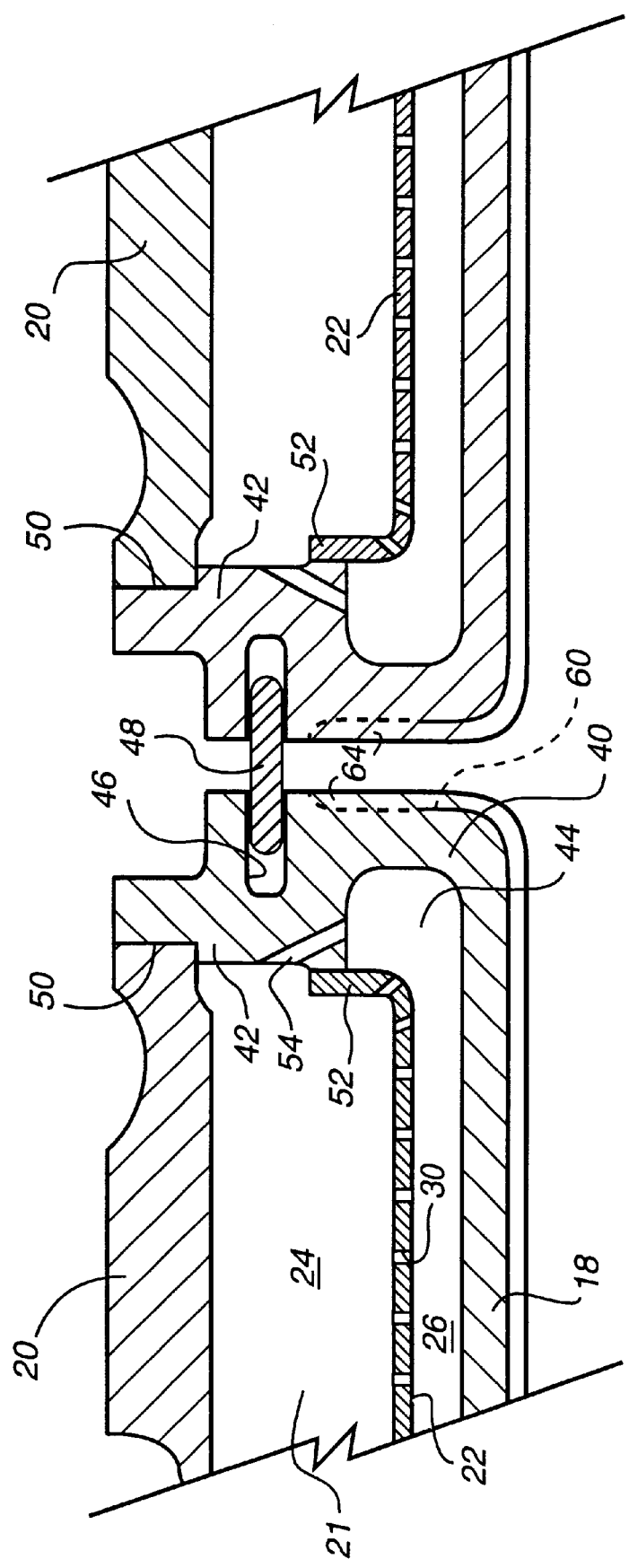
FIG. 2 is an enlarged fragmentary cross-sectional view illustrating a joint between side walls of adjacent nozzle segments illustrating the location of the thermal barrier coating along the side walls of adjoining nozzle segments.

Referring now to FIG. 2, there is illustrated a juncture between adjacent nozzle segments. It will be appreciated that while the following description is specific with reference to the outer band 12, it is equally applicable to the inner band 14. Thus, each nozzle band (both inner and outer bands) includes a nozzle side wall or edge 40 which extends generally radially between the nozzle wall 18 and the cover 20. The band also includes an inturned flange 42 spaced from the nozzle wall 18 and defines with wall 18 and side wall or edge 40 an undercut region 44. The inturned flange 42 also includes a circumferentially opening slot 46 for receiving one edge of a spline 48 forming a seal between adjacent nozzle segments.

As illustrated in FIG. 2, the covers 20 are welded to the inturned flanges 42 along opposite edges of the nozzle band. Also, the weld joint 50 lies on the side of the spline seal 48 remote from the nozzle wall 18. By locating the weld joint 50 away from the hot gas path defined in part by nozzle wall 18, the weld joint 50 is subjected to a much lower temperature than if located closer to the hot gas path. Also illustrated in FIG. 2 is the impingement plate 22 which has a turned edge 52 along opposite margins for brazing or welding to an inside surface of the inturned flange 42. While apertures 30 are located in each turned edge 52 of the impingement plate, it will be appreciated that there is a substantial distance between the nearest aperture 30 and the side wall or edge 40 in the undercut region 44. This large distance diminishes the effectiveness of the impingement cooling. As set forth in co-pending application Ser. No. 09/543,457, impingement cooling apertures 54 are formed through the inturned flange 42 to provide cooling steam in the undercut region 44 for direct impingement cooling of side wall 40.

As noted previously, most preferably the thickness of the side wall 40 is controlled to tight tolerances. The side wall thickness is, however, very sensitive to manufacturing tolerances, i.e., a casting tolerance, as well as weld and machining distortions. By applying a thermal barrier coating as a buffer for the manufacturing tolerance after the covers 20 are welded to the nozzle casting, a known metal wall thickness can be provided upon final machining. To control the thickness of the side wall 40, a step 60 is preferably premachined into the side wall based on the inside position of the wall. That is, the inside surface of the side wall 40 serves as the datum for the machining. The step is preferably provided the side walls after the nozzle covers 20 are welded onto the main nozzle casting of the segment such that distortions caused by the welding are built into the joint. After premachining, the side wall is masked past the premachined surfaces and coated with the thermal barrier coating 64. As illustrated, the coating is also applied to the wall surfaces of the nozzle wall 18 in contact with the hot gases flowing along the hot gas path. The side walls 40 of the nozzle segments are then final-machined, using a method compatible with machining thermal barrier coatings and metal, for example, a creep-feed grind operation. The final machining step can control the wall thickness of the side wall to a very tight tolerance not affected by weld or casting tolerances. The process affords a buffer, i.e., an accommodation that reduces sensitivity to manufacturing tolerances. For example, when the side wall is out-of-tolerance and the thermal barrier coating is thick, the coating is final-machined to a combined thickness for the side wall plus coating which will meet cooling requirements, i.e., the impingement cooling is sufficient to maintain the side wall within desired temperature ranges while the remaining TBC affords added thermal protection. If the final machining step results in little or no thermal barrier coating along the side wall, the thermal barrier coating is not needed. Impingement cooling of the side wall is effective because the side wall is within the tightly toleranced desired thickness. Thus, the side wall is cooled properly. The capacity to absorb or accommodate manufacturing tolerances using the thermal barrier coating as a buffer enhances the low cycle fatigue of the nozzle segment.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of manufacturing nozzle segments, each having nozzle bands and at least one vane extending therebetween, the nozzle bands having side walls adjacent one another when the nozzle segments are assembled in a generally annular array thereof for use in a gas turbine, comprising the steps of:

applying a thermal barrier coating to at least one side wall of each nozzle band of each segment; and machining said one side wall with the thermal barrier coating serving as a buffer to accommodate manufacturing tolerances in the segment thereby controlling the side wall thickness of each nozzle segment.

2. A method according to claim 1 including forming a step in at least said one side wall of said segment, and applying the thermal barrier coating in said step.

3. A method according to claim 1 including forming a step in each of the side walls of adjacent nozzle bands, applying a thermal barrier coating in each step, and machining each side wall with the thermal barrier coating serving as a buffer to accommodate manufacturing tolerances in the nozzle segments, thereby controlling the side wall thicknesses of the nozzle segments.

4. A method according to claim 1 wherein said step of machining includes removing all of the thermal barrier coating applied to the side wall of at least one of the nozzle segment.

5. A method according to claim 1 wherein said step of machining includes removing a portion of the thermal barrier coating and leaving a portion of the thermal barrier coating on the side wall.

6. A method according to claim 5 including leaving a portion of the coating along the entirety of the step for med along the side wall.

7. A method according to claim 1 including welding a cover and the nozzle band to one another defining a chamber therebetween for receiving a cooling medium, the step of machining being performed subsequent to welding the cover and nozzle band to one another.

* * * * *

UNITED STATES PATENT AND TRADEMARK OFFICE
CERTIFICATE OF CORRECTION

PATENT NO.    : 6,418,618 B1
DATED         : July 16, 2002
INVENTOR(S)   : Burdgick It is certified that error appears in the above-identified patent and that said Letters Patent is hereby corrected as shown below:

<u>Column 6,</u>
Line 7, delete "the" and insert -- each nozzle --;
Line 10, delete "said" and insert -- each said nozzle --;
Line 26, delete "the" and insert -- said one --;
Line 29, after "the" insert -- one --.

Signed and Sealed this

Twenty-first Day of January, 2003

JAMES E. ROGAN
*Director of the United States Patent and Trademark Office*